(12) United States Patent
Castle et al.

(10) Patent No.: US 12,108,297 B2
(45) Date of Patent: *Oct. 1, 2024

(54) DYNAMIC MANAGEMENT OF TELECOMMUNICATION SERVICES AT USER EQUIPMENT

(71) Applicant: T-Mobile USA, Inc., Bellevue, WA (US)

(72) Inventors: Grant Castle, Bellevue, WA (US); Hsin-Fu Henry Chiang, Bellevue, WA (US); Syed Toaha Ahmad, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,121

(22) Filed: Jan. 4, 2023

(65) Prior Publication Data
US 2023/0138211 A1 May 4, 2023

Related U.S. Application Data

(63) Continuation of application No. 17/219,903, filed on Apr. 1, 2021, now Pat. No. 11,570,674.

(51) Int. Cl.
*H04W 36/12* (2009.01)
*H04W 36/00* (2009.01)
(Continued)

(52) U.S. Cl.
CPC ..... *H04W 36/125* (2018.08); *H04W 36/0066* (2013.01); *H04W 36/32* (2013.01);
(Continued)

(58) Field of Classification Search
CPC ..... H04W 76/00; H04W 76/16; H04W 76/20; H04W 76/25; H04W 36/36;
(Continued)

(56) References Cited

U.S. PATENT DOCUMENTS 7,151,939 B2  12/2006  Sheynblat
7,953,401 B2   5/2011  Hutchison et al.
(Continued)

FOREIGN PATENT DOCUMENTS

EP  2019558 B1  11/2012
EP  2265055 A3   1/2013
(Continued)

*Primary Examiner* — Robert C Scheibel
(74) *Attorney, Agent, or Firm* — Perkins Coie LLP (57) ABSTRACT

Systems and methods for dynamically managing the states (e.g., enabling/disabling) of telecommunication services/features are disclosed. To do so, the system associates parameters (e.g., timers) with the impacted services/features. For example, when a user experiences issues with voice calls, he/she calls the telecommunications service provider (carrier) to help resolve the issue. A customer care representative may ask the user to temporality turn off the VoNR service to help alleviate the issue. When the user turns off (or toggles off) the VoNR service on his/her mobile device, the system can start a configurable timer (parameter) for the VoNR service. In this manner, the system can replace the conventional toggle on/off feature with a time-based feature. The system monitors the timer's value and when the timer's value reaches a target value (e.g., 24 hours, 1 week, etc.), the system alerts the user that the VoNR service will be turned on (or toggled on).

20 Claims, 7 Drawing Sheets

(51) Int. Cl.
*H04W 36/32* (2009.01)
*H04W 36/38* (2009.01)
*H04W 76/16* (2018.01)
*H04W 76/25* (2018.01)

(52) U.S. Cl.
CPC ......... *H04W 36/385* (2013.01); *H04W 76/16* (2018.02); *H04W 76/25* (2018.02)

(58) Field of Classification Search
CPC ............. H04W 36/365; H04W 36/125; H04W 36/0066; H04W 36/32; H04W 36/385; H04W 60/005; H04W 41/22; H04Q 2213/13175
See application file for complete search history.

(56) References Cited

U.S. PATENT DOCUMENTS

| | | | |
|---|---|---|---|
| 8,094,586 | B2 | 1/2012 | Kleo |
| 8,099,112 | B2 | 1/2012 | Krishnamurthi et al. |
| 8,130,738 | B2 | 3/2012 | Chan et al. |
| 8,417,234 | B2 | 4/2013 | Sanding et al. |
| 8,422,988 | B1 | 4/2013 | Keshav |
| 8,639,245 | B2 | 1/2014 | Shi et al. |
| 8,719,371 | B1 | 5/2014 | Nerieri |
| 8,855,693 | B2 | 10/2014 | Pantelidou et al. |
| 8,909,305 | B2 | 12/2014 | Guedalia et al. |
| 8,965,392 | B2 | 2/2015 | Backholm et al. |
| 8,974,544 | B2 | 3/2015 | Hubner et al. |
| 9,037,126 | B2 | 5/2015 | Chen et al. |
| 9,042,311 | B2 | 5/2015 | Zhu |
| 9,049,580 | B2 | 6/2015 | Zhang |
| 9,094,943 | B2 | 7/2015 | Klingenbrunn et al. |
| 9,100,874 | B2 | 8/2015 | Yaqub et al. |
| 9,137,739 | B2 | 9/2015 | Raleigh |
| 9,271,297 | B2 | 2/2016 | Valentin et al. |
| 9,313,812 | B2 | 4/2016 | Bangolae et al. |
| 9,326,212 | B2 | 4/2016 | Liu |
| 9,420,538 | B2 | 8/2016 | Preteseille et al. |
| 9,473,872 | B2 | 10/2016 | Kaura |
| 9,485,692 | B2 | 11/2016 | Sawhney et al. |
| 9,503,988 | B2 | 11/2016 | Mach |
| 9,510,243 | B2 | 11/2016 | Kordianowski et al. |
| 9,641,264 | B2 | 5/2017 | Jarvis |
| 9,661,529 | B2 | 5/2017 | Speicher et al. |
| 9,756,462 | B2 | 9/2017 | Dhandu et al. |
| 9,820,319 | B2 | 11/2017 | Iwai et al. |
| 10,003,689 | B2 | 6/2018 | Bostick et al. |
| 10,009,744 | B2 | 6/2018 | Wang et al. |
| 10,028,225 | B2 | 7/2018 | Ayyagari et al. |
| 10,028,289 | B2 | 7/2018 | Zhou et al. |
| 10,069,961 | B2 | 9/2018 | Han |
| 10,212,621 | B2 | 2/2019 | Yang et al. |
| 10,212,690 | B1 | 2/2019 | Lau et al. |
| 10,321,287 | B2 | 6/2019 | Rune et al. |
| 10,425,860 | B2 | 9/2019 | Oktay et al. |
| 10,509,910 | B2 | 12/2019 | Mahaffey et al. |
| 10,524,164 | B2 | 12/2019 | Mathison et al. |
| 10,554,506 | B2 | 2/2020 | Joul et al. |
| 10,575,218 | B2 | 2/2020 | Wang et al. |
| 10,581,581 | B2 | 3/2020 | Horn et al. |
| 10,588,034 | B1 | 3/2020 | Dowlatkhah et al. |
| 10,645,573 | B2 | 5/2020 | Fleischman et al. |
| 10,667,120 | B2 | 5/2020 | Iwai |
| 10,694,047 | B2* | 6/2020 | Pollak .................. H04M 15/888 |
| 10,701,593 | B2 | 6/2020 | Chaudhuri et al. |
| 10,827,332 | B2 | 11/2020 | Mccann |
| 10,834,573 | B2 | 11/2020 | Osterwise et al. |
| 10,841,399 | B2 | 11/2020 | Uppili |
| 10,932,273 | B2 | 2/2021 | Meredith et al. |
| 2004/0142683 | A1 | 7/2004 | Clark et al. |
| 2006/0203722 | A1 | 9/2006 | Oommen |
| 2007/0008902 | A1 | 1/2007 | Yaramada et al. |
| 2007/0275767 | A1* | 11/2007 | Steele .................... H04M 19/04 455/567 |
| 2008/0240053 | A1 | 10/2008 | Oswal et al. |
| 2008/0274729 | A1 | 11/2008 | Kim et al. |
| 2010/0311402 | A1 | 12/2010 | Srinivasan et al. |
| 2012/0026882 | A1 | 2/2012 | Park et al. |
| 2014/0080479 | A1* | 3/2014 | Vangala ................ H04W 88/06 455/424 |
| 2014/0241255 | A1 | 8/2014 | Batchu et al. |
| 2015/0223203 | A1 | 8/2015 | Lindner et al. |
| 2015/0248378 | A1* | 9/2015 | Nordback ............. G06F 40/109 715/243 |
| 2015/0358837 | A1 | 12/2015 | Iwai |
| 2016/0353356 | A1 | 12/2016 | Payyappilly et al. |
| 2017/0012891 | A1 | 1/2017 | Nylander et al. |
| 2018/0241645 | A1 | 8/2018 | Qureshi |
| 2019/0007811 | A1 | 1/2019 | Choi et al. |
| 2019/0098473 | A1 | 3/2019 | Madey et al. |
| 2019/0364509 | A1 | 11/2019 | Bonazzoli et al. |
| 2020/0213887 | A1 | 7/2020 | Chen |
| 2020/0274777 | A1 | 8/2020 | Liu et al. |
| 2020/0404741 | A1 | 12/2020 | Kang |
| 2021/0037363 | A1 | 2/2021 | Yang et al. |
| 2021/0076250 | A1 | 3/2021 | Wang et al. |
| 2021/0392557 | A1* | 12/2021 | Mallikarjunan ...... H04W 36/14 |

FOREIGN PATENT DOCUMENTS

| | | |
|---|---|---|
| EP | 1613107 A3 | 11/2016 |
| EP | 2392182 B1 | 8/2018 |
| EP | 2136514 B1 | 10/2018 |
| EP | 2553952 B1 | 10/2018 |
| EP | 2392088 B1 | 12/2018 |
| EP | 2892195 B1 | 9/2019 |
| EP | 3614744 A1 | 2/2020 |
| EP | 3641410 A1 | 4/2020 |
| EP | 3742795 A1 | 11/2020 |
| WO | 2010022168 A1 | 2/2010 |
| WO | 2011139462 A2 | 11/2011 |
| WO | 2013023779 A1 | 2/2013 |
| WO | 2014029520 A1 | 2/2014 |
| WO | 2014071974 A1 | 5/2014 |
| WO | 2014189569 A1 | 11/2014 |
| WO | 2016144474 A1 | 9/2016 |
| WO | 2017189067 A1 | 11/2017 |
| WO | 2019023151 A1 | 1/2019 |
| WO | 2019081026 A1 | 5/2019 |
| WO | 2019081027 A1 | 5/2019 |
| WO | 2019143703 A1 | 7/2019 |
| WO | 2020083346 A1 | 4/2020 |
| WO | 2020125180 A1 | 6/2020 |
| WO | 2020207932 A1 | 10/2020 |

\* cited by examiner

⚠ Alert

The VoNR service on your phone will be turned back ON in 10 minutes.

[Click here to snooze for 24 hours] [Click here to snooze for 1 week] [Click here to snooze for 1 month] [Ok]

DYNAMIC MANAGEMENT OF TELECOMMUNICATION SERVICES AT USER EQUIPMENT

CROSS-REFERENCE TO RELATED APPLICATIONS

This application is a continuation of U.S. patent application Ser. No. 17/219,903, now U.S. Pat. No. 11,570,674, filed on Apr. 1, 2021, entitled DYNAMIC MANAGEMENT OF TELECOMMUNICATION SERVICES AT USER EQUIPMENT, which is hereby incorporated by reference in its entirety.

BACKGROUND

Various types of networks, including wireless networks, cellular networks, and other types of telecommunications networks, provide people across the world with communication services. For example, in most locations around the world, a user of a mobile device can access a network and communicate with other users or systems, either via voice calls, text messages, or data over the Internet. These networks, and their entrenched ubiquity, have connected users to many different users as well as to vast troves of information and services. Telecommunication networks, arguably, have made the world better for people.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Telecommunications service providers routinely release new services/features and/or make changes to existing services/features. When a new service/feature is rolled out to customers, some customers experience issues with their customer experience. Example services/features include, but are not limited to, voice over LTE, voice over 5G, voice over WiFi, using a radio like 5G, Bluetooth, or WiFi, using an access domain like roaming, Rich Communication Services (RCS) Messaging, and so on. For example, when a service like voice over 5G (Voice over 5G New Radio-VoNR) or voice over WiFi is rolled out to customers in a geographic area, a subset of those customers may experience deteriorated call connectivity. It is common during new feature rollouts that small, niche, corner case problems exist in early phases of technology development and while the feature may deliver benefits to the vast majority of users in an area, there can be a small number of customers experiencing unexpected degradation. In response to these issues, customers typically contact their telecommunications service provider's customer care to resolve the issue. To help resolve the issue, the customer care often asks the customer to temporarily turn off the new service/feature. By teaching the customer how to turn off a service/feature, the customer care can help frustrated customers to feel better by alleviating their current issue. But, this creates another problem: customers often forget or choose not to turn the service/feature back on. Once the new technologies are improved and matured, these corner case degradations get fixed and previously impacted customers are no longer at risk. Oftentimes, customers don't know it is time to re-enable the feature or fail to recall how to turn the feature back on, foregoing opportunities to utilize enhanced service/features offered by their telecommunications service provider. As another example, access technology, like 5G, may not enhance the voice experience in the beginning but it is important to a telecommunications service provider to migrate the users to meet long-term strategy, coverage, and capacity planning goals. It is important for the service provider to move users to use one particular voice path but the user may not be motivated to re-enable the service due to no difference experience gain to them. Furthermore, with conventional systems, when the service/feature is automatically turned back on, but the underlying issue is not yet resolved, customers are unhappy to be "returned" to the old unsatisfactory experience. For example, at the Vo5G service "Off" expiry, a customer would be surprised by the old problem or bad experience of Vo5G coming back. The customer can be frustrated and confused about this experience: upset at missing important phone calls, cannot find the settings to turn the feature back off, and so on.

To solve these and other problems associated with new and/or enhanced services/features rollout, systems and methods for dynamically managing the states (e.g., enabling/disabling) of telecommunication services/features are disclosed. To do so, the system associates parameters (e.g., timers) with the impacted services/features. For example, when a user experiences issues with voice calls, he/she calls the telecommunications service provider (carrier) to help resolve the issue. A customer care representative may ask the user to temporality turn off the VoNR service to help alleviate the issue. When the user turns off (or toggles off) the VoNR service on his/her mobile device, the system can start a configurable timer (parameter) for the VoNR service. In this manner, the system can replace the conventional toggle on/off feature with a time-based feature. The carrier's server can also be informed by quality teams which can continually tune the Off Timer value based on the deployment status of known fixes. The system monitors the timer's value and when the timer's value reaches a target value (e.g., 24 hours, 1 week, etc.), the system alerts the user that the VoNR service will be turned on (or toggled on). The alert can be in the form of a pop-up window that notifies the user before the timer's expiry and provides the user with an option to extend the temporary change. Alternatively, the alert can give users multiple values to choose from: e.g., 24 hours, one week, and one month. The system can use a remote management server, such as the telecom carrier's configuration server or Standard's Open Mobile Device Management framework to control the timer's target value(s). In some implementations, the system can present a final popup to allow the user to extend the change for a final time. Such an alert can be in the form of a pop-up window that has an option (e.g., button) for the user to acknowledge that the option will be removed at the timer's expiry, and instructions to contact a customer care representative with any questions.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
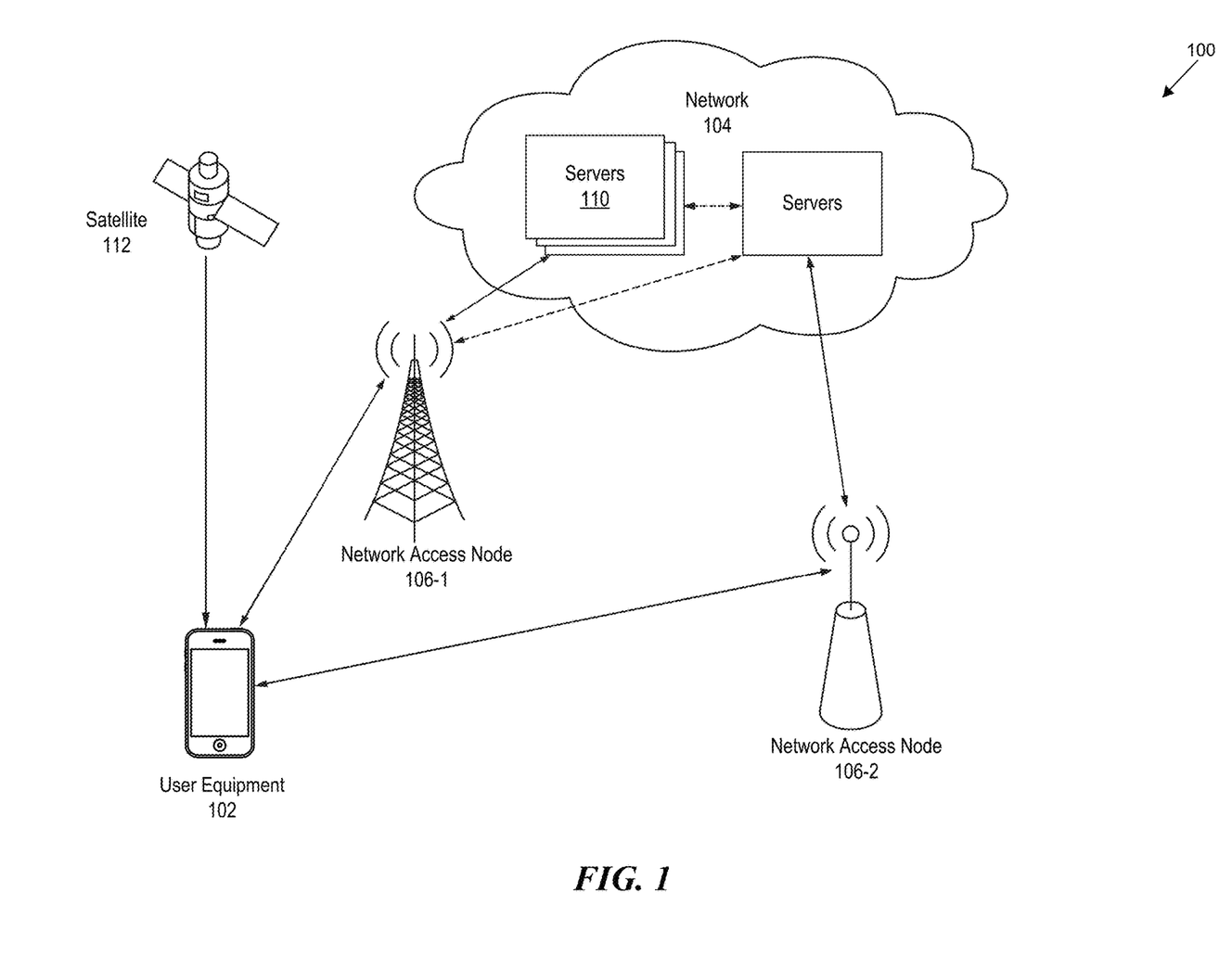
FIG. 1 is a block diagram that illustrates a system that can dynamically manage states of services/features at user equipment.

FIG. 1 is a block diagram that illustrates a system 100 that can dynamically manage states of services/features at user equipment. The system 100 includes a user equipment 102 that is communicatively coupled to one or more networks 104 via network access nodes 106-1 and 106-2 (referred to collectively as network access nodes 106).

The user equipment 102 is any type of electronic device that can communicate wirelessly with a network node and/or with another electronic device in a cellular, computer, and/or mobile communications system. Examples of the user equipment 102 includes smartphones (e.g., APPLE (PHONE, SAMSUNG GALAXY), tablet computers (e.g., APPLE IPAD, SAMSUNG NOTE, AMAZON FIRE, MICROSOFT SURFACE), wireless devices capable of machine-to-machine (M2M) communication, wearable electronic devices, movable Internet of Things devices (IoT devices), and any other handheld device that is capable of accessing the network(s) 104. Although only one user equipment 102 is illustrated in FIG. 1, the disclosed embodiments can include any number of user equipment.

The user equipment 102 can store and transmit (e.g., internally and/or with other electronic devices over a network) code (composed of software instructions) and data using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical) or other forms of propagated signals, such as carrier waves or infrared signals.

The user equipment 102 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given user equipment typically stores instructions for execution on a processor(s) of that user equipment. One or more parts of an embodiment of the present disclosure can be implemented using different combinations of software, firmware, and/or hardware. The user equipment 102 can estimate its location from global positioning system (GPS) signals received from the satellites 112.

The network access nodes 106 can be any type of radio network node that can communicate with a wireless device (e.g., user equipment 102) and/or with another network node. The network access nodes 106 can be a network device or apparatus. Examples of network access nodes include a base station (e.g., network access node 106-1), an access point (e.g., network access node 106-2), or any other type of network node such as a network controller, radio network controller (RNC), base station controller (BSC), a relay, transmission points, and the like.

The system 100 depicts different types of wireless access nodes 106 to illustrate that the user equipment 102 can access different types of networks through different types of network access nodes. For example, a base station (e.g., the network access node 106-1) can provide access to a cellular telecommunications system of the network(s) 104. An access point (e.g., the network access node 106-2) is a transceiver that provides access to a computer system of the network(s) 104.

The network(s) 104 can include any combination of private, public, wired, or wireless systems such as a cellular network, a computer network, the Internet, and the like. Any data communicated over the network(s) 104 can be encrypted or unencrypted at various locations or along different portions of the networks. Examples of wireless systems include Wideband Code Division Multiple Access (WCDMA), High Speed Packet Access (HSPA), Wi-Fi, Wireless Local Area Network (WLAN), and Global System for Mobile Communications (GSM), GSM Enhanced Data Rates for Global Evolution (EDGE) Radio Access Network (GERAN), 4G or 5G wireless wide area networks (WWAN), and other systems that can also benefit from exploiting the scope of this disclosure.

The system 100 includes a manager node 110 that enables dynamic management of one or more features/services associated with user equipment 102 (as discussed in detail below).

Dynamic Management of Services/Features

Figure 2:
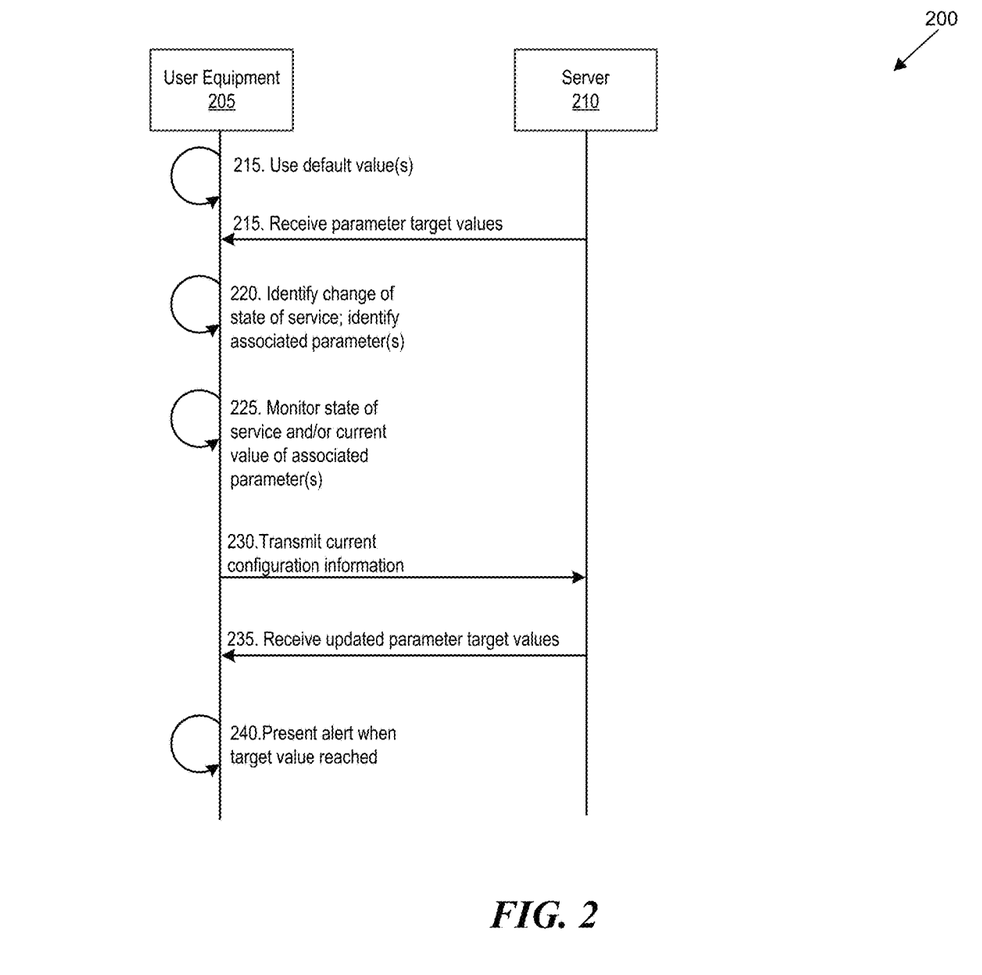
FIG. 2 is a sequence diagram that illustrates operations performed by some implementations of the disclosed system.

FIG. 2 is a sequence diagram that illustrates a set of operations 200 performed by some implementations of the disclosed system. At act 215, user equipment 205 receives target values of one or more parameters in a set of configurable parameters. Examples of parameters include, but are not limited to, timers, counters, and so on. In some implementations, the user equipment 205 uses default parameter target values independent of a check with server 210. For example, user equipment 205 can use a cached value and a local default value if no cached value is available. In some implementations, when user device 205 is in a roaming network, which may be at an early stage of technology (e.g., 4G) when the home network is already in a more mature stage of technology (e.g., 5G), the servers associated with the roaming and home networks can have different sets of parameter target values based on the technological stage of the respective networks.

Each parameter is associated with a service or feature of the user equipment and/or telecommunications service provider, and can have one or more target values, as well as a default value. For example, a time parameter associated with a VoNR service can have the following target values: 24 hours, 1 week, 1 month, and so on, with a default value of 1 week. Server 210, which is associated with the telecommunications service provider, can send the parameter target values to user equipment 205 (periodic and/or event-based updates). For example, when a new service is rolled out to customers, server 210 can send a smaller target value for a parameter associated with the new service compared to a higher target value when the service is more mature. The telecommunications service provider can manage the transmission of the target values via Open Mobile Alliance (OMA) device management framework. Alternatively and/or additionally, user equipment 205 can request parameter target values from server 210 (periodic and/or event-based requests). For example, when user equipment 205 detects more frequent issues with a user equipment feature, user equipment 205 can request updated target values for the parameter(s) associated with the impacted feature. In addition to receiving target parameter values for existing parameters, user equipment 205 can receive from server 210, information about new parameters (e.g., parameter name, parameter type (e.g., timer, counter, etc.), target value(s), default value, associated service/feature, expected behavior when current parameter value approaches the target value, and so on). User equipment 205 can store the received target values of the one or more parameters in a configurable connected memory.

Figure 3:
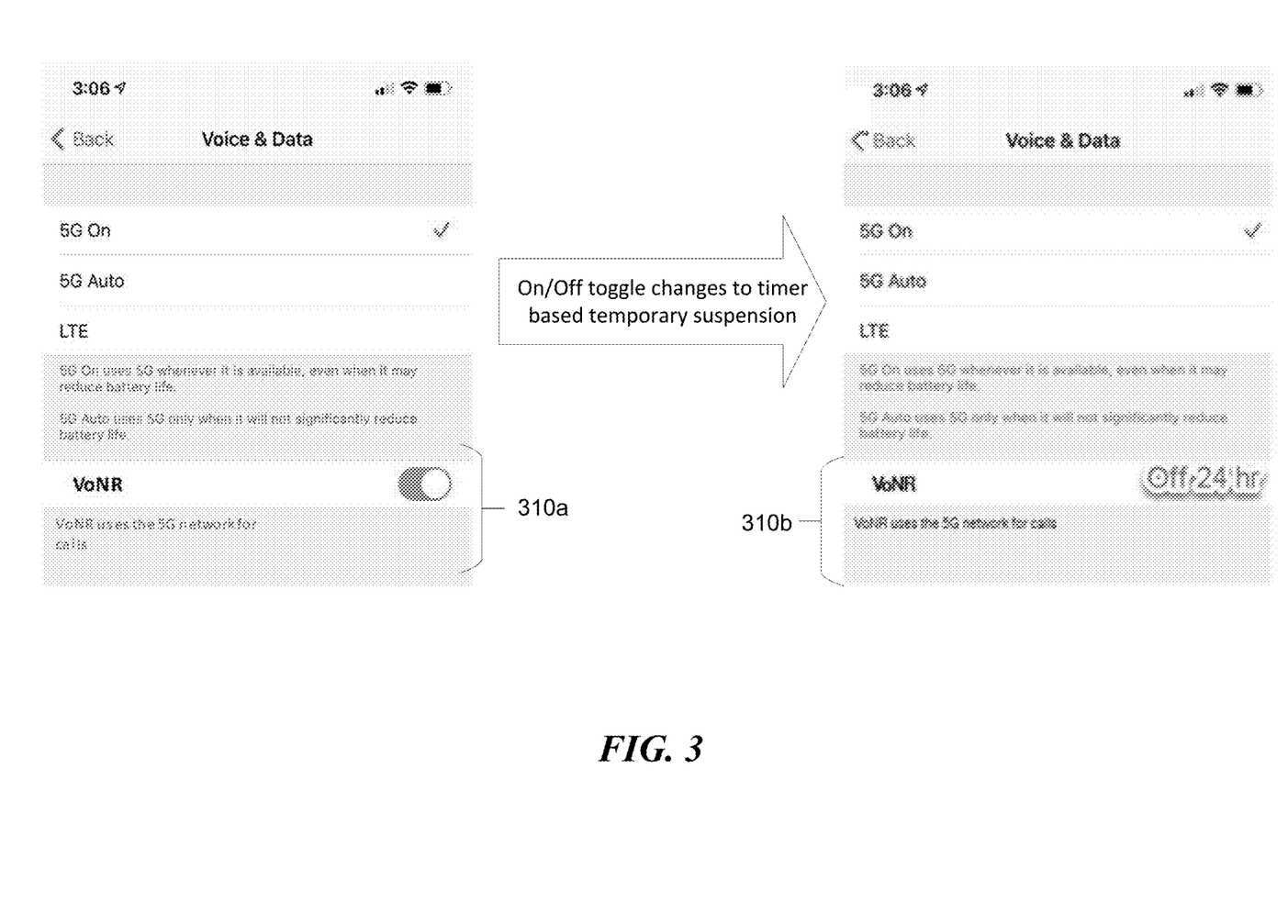
FIG. 3 is an example user interface displayed by some implementations of the disclosed system.

At act 220, user equipment 205 determines a state change of a service/feature. For example, the user equipment can identify that a service's state has been changed from enabled to disabled. The state change can be performed automatically (e.g., in response to a message received from a node of the telecommunications service provider, at the expiry of a time period, etc.) or manually by a user (e.g., in response to a user action, etc.). For example, a user can disable a WiFi feature to resolve connectivity issues with user equipment 205. Or a telecommunications service provider can enable VoNR service when it rolls out 5G service in an area where user equipment 205 is currently located. Upon determining that a service/feature's state has been changed, user equipment 205 identifies one or more parameters (and their target value(s)) associated with the changed service/feature, or example, the user equipment determines that the WiFi feature is associated with a counter parameter, which tracks the number of times the WiFi feature's state has been changed in a given time period (e.g., WiFi feature has been turned on/off four times during the week). In some implementations, the user equipment modifies the user interface associated with the impacted service to display the associated parameters. For example, as shown in FIG. 3, an on/off toggle option 310a for the VoNR service is replaced by a time-based temporary suspension option 310b.

At act 225, user equipment 205 monitors the state and/or a current value of the identified parameter. For example, when the state of a VoNR service is changed (e.g., enabled-→disabled), the user equipment triggers a countdown (or count-up) of an associated timer parameter, and changes its value by a minimum value (e.g., 60 seconds, 30 minutes, 1 hour, 24 hours, and so on). As another example, the state and/or current value of the identified parameter is the last countdown the user can trigger or renew. After this last countdown, the service is always on. The user equipment can monitor the current value of the associated timer parameter to determine when one or more rules for the parameter are met. For example, a parameter rule can specify that an alert is to be generated when the current parameter value is within a threshold value of the parameter's target value. The threshold value can also be received at act 215 from server 210. As another example, a parameter rule can specify that an alert is to be generated when the current parameter value exceeds (or falls below) the parameter's target value. In some implementations, when a parameter is associated with two or more target values (e.g., snooze for 24 hours, one week, or one month), the user equipment can present the multiple target values at a user interface and receive a selection from a user of a selected target value. The selected target value is then used by the user equipment when monitoring whether the parameter rules are met.

Figure 4A:
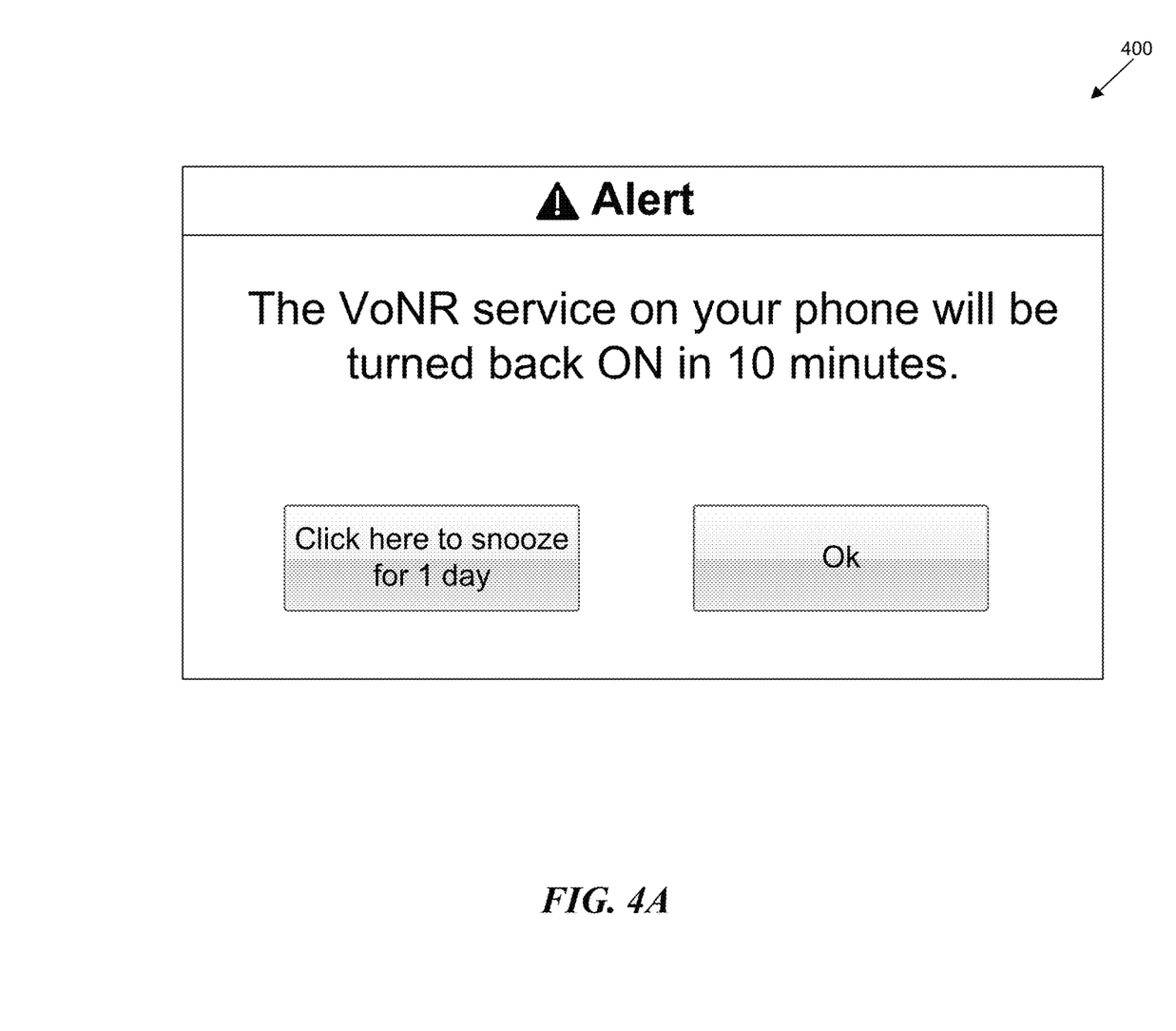
FIGS. 4A-4C are example user interfaces displayed by some implementations of the disclosed system.
Figure 4B:
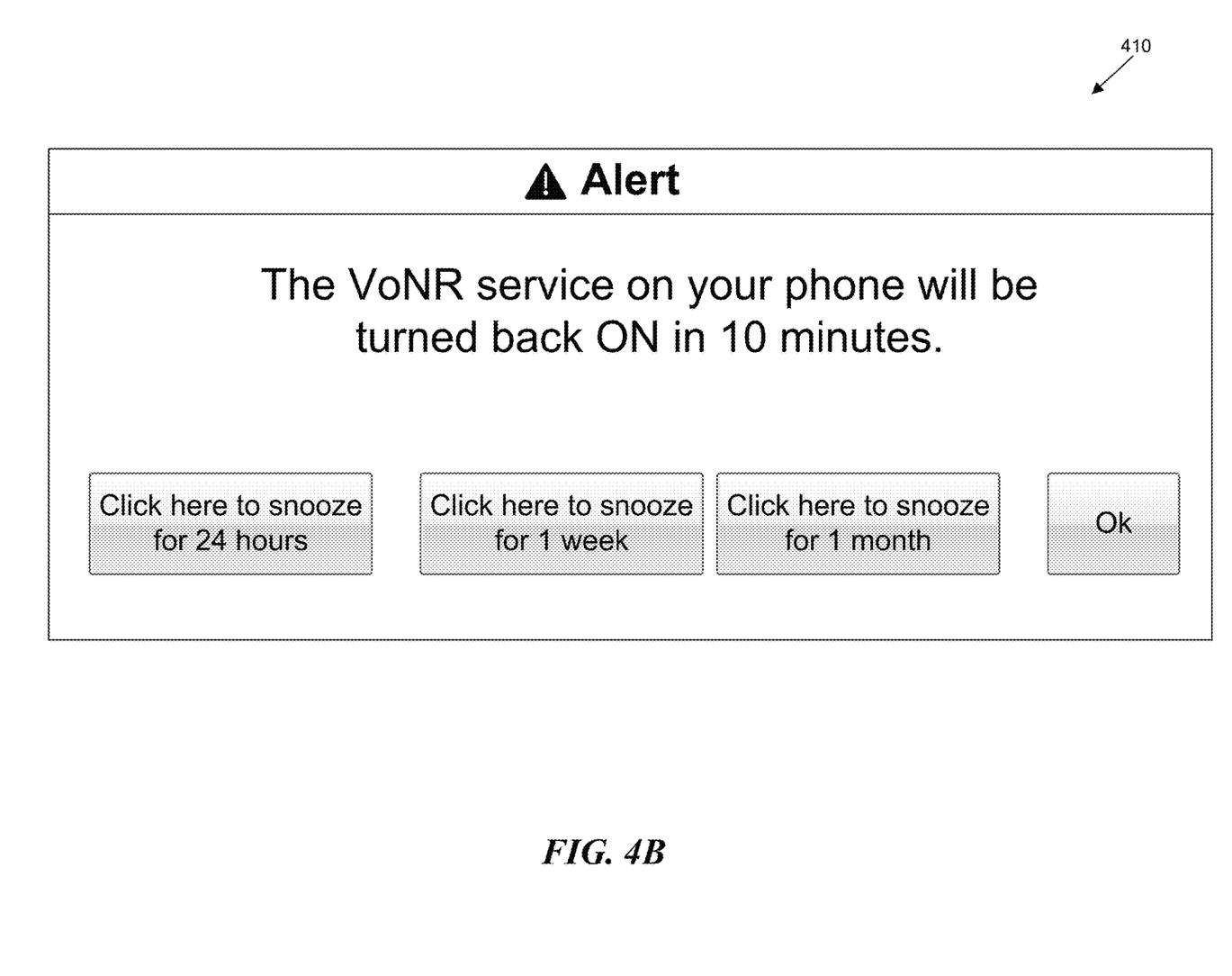
Figure 4C:
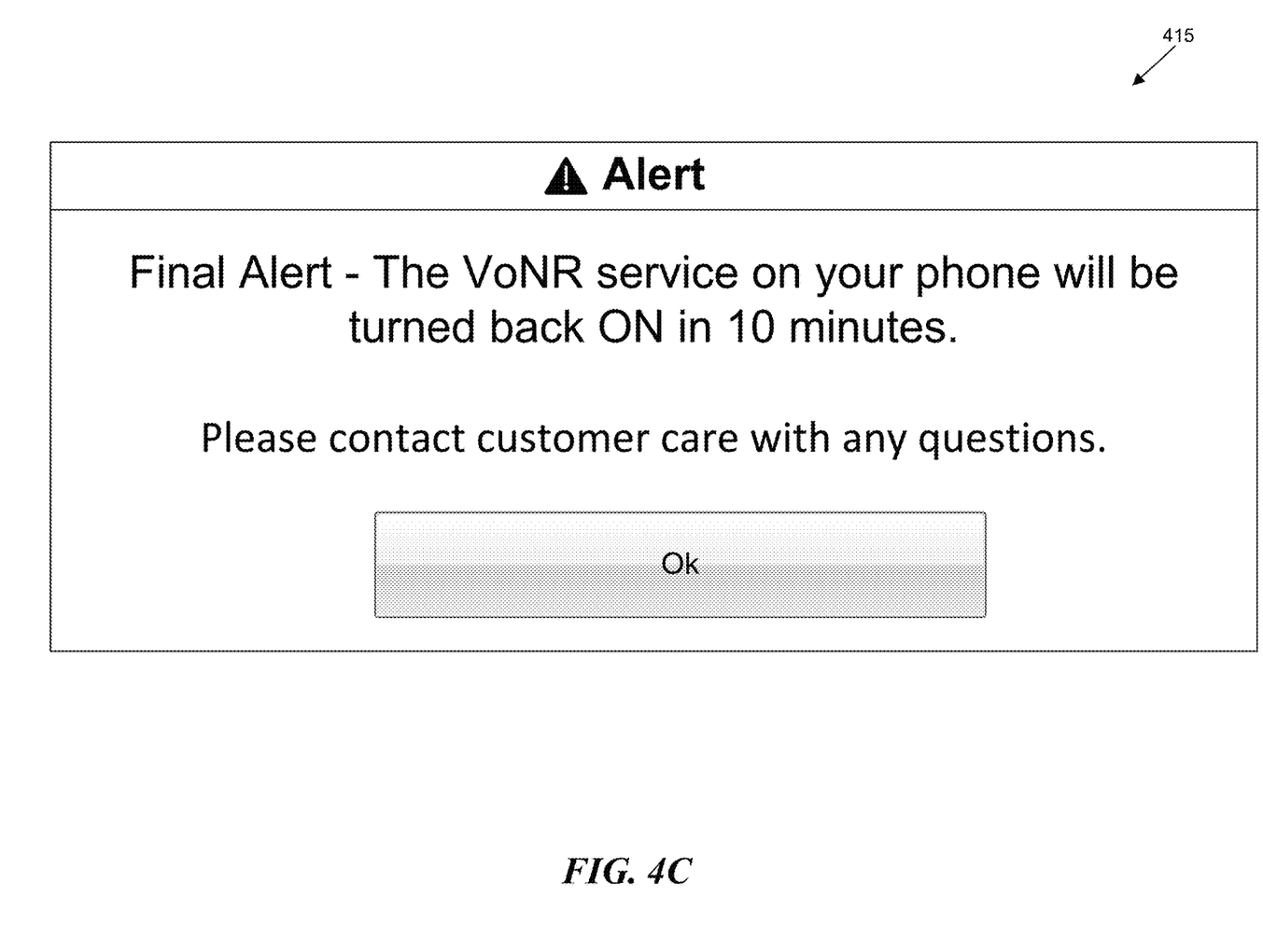

When the parameter rules are met, at act 240, user equipment 205 can take one or more action(s). Examples of action(s) include, but are not limited to, visual alert(s), audible alert(s), haptic alert(s), notification(s), message(s), call(s), and so on. For example, when the current value of the identified parameter is within a threshold value of a target value of the identified parameter, user equipment 205 presents a visual alert (e.g., pop-up) indicating that the current state of the service associated with the mobile device will be changed to another state (e.g., previous state). FIGS. 4A-4C are example user interfaces displaying alerts by some implementations of the disclosed system. For example, as shown in FIG. 4A, a popup notification 400 can notify the user before a VoNR timer's expiry and provide the user with an option to extend the temporary change. FIG. 4B shows an alternative approach where a popup notification 410 can allow users to select among multiple parameter value options (e.g., 24 hours, one week, and one month). In some implementations, a final popup 415, as shown in FIG. 4C, enables the user to extend the change one last time. The popup 415 can have a button for the user to acknowledge that the option will be removed at the expiration of the timer.

User equipment 205 can transmit (act 230), at periodic intervals (or in an event-driven manner), a message comprising one or more of the following information to server 210 (or any other server associated with the telecommunications service provider): a current state of the service associated with the user equipment, the current value of the identified parameter, or the target value of the identified parameter. Similarly, at periodic internals (or in an event-driven manner), user equipment 205 can receive updated parameter target values from server 210 (act 235). For example, in response to transmitting the current configuration information, user equipment 205 receives updated parameter target values from server 210.

Computer System

Figure 5:
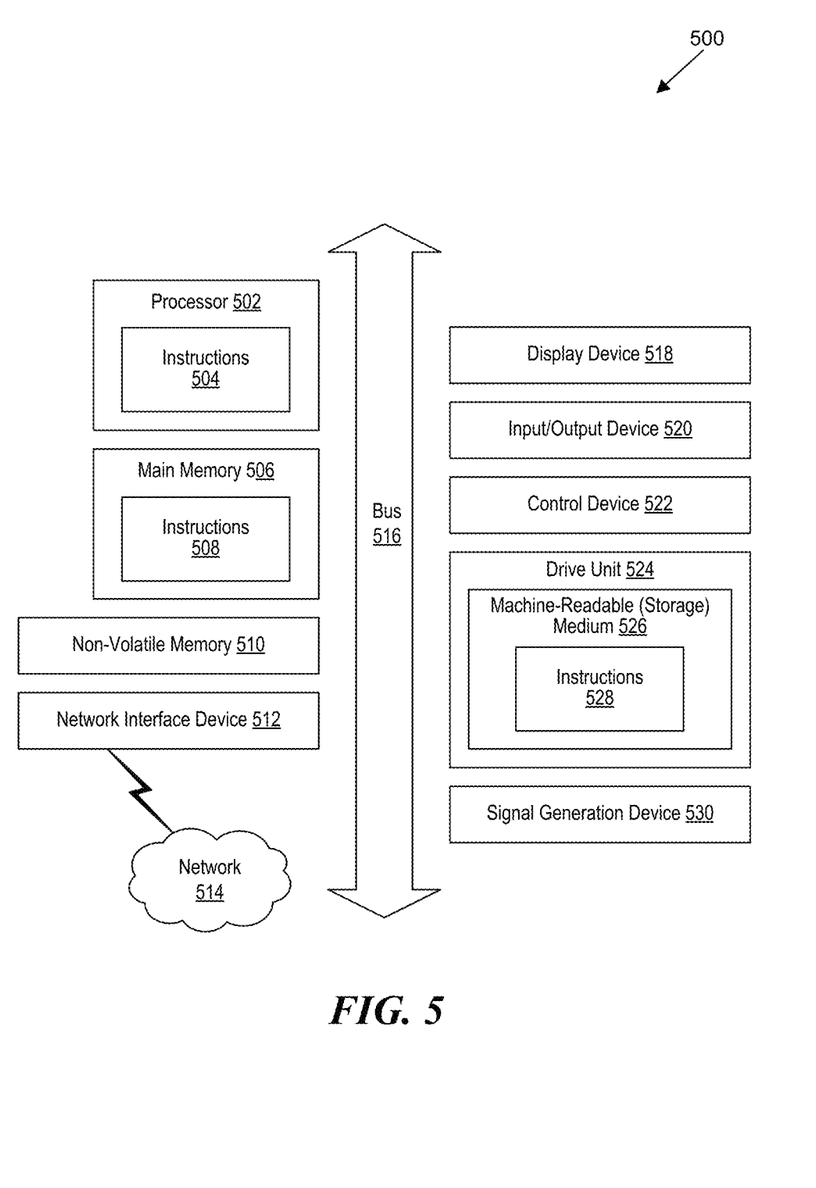
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the a computing system 500 to perform operations to execute elements involving the various aspects of the disclosure.

Some portions of the disclosure can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one non-transitory computer-readable storage medium carrying instructions, which, when executed by at least one data processor of a system, cause the system to:
    receive target values of one or more parameters in a set of configurable parameters;
    determine a change of state of a service associated with a user equipment from a previous state to a current state;
    identify, at the user equipment, a parameter, selected from the set of configurable parameters, associated with the service,
        wherein the identified parameter is a timer or counter associated with the service;
    monitor, at the user equipment, a current value of the identified parameter; and
    when the current value of the identified parameter is within a threshold value of a target value of the identified parameter, present an alert at the user equipment indicating that the current state of the service associated with the user equipment will be changed to another state.

2. The at least one non-transitory computer-readable storage medium of claim 1, wherein the target values are received from a node of a telecommunications service provider.

3. The at least one non-transitory computer-readable storage medium of claim 1, wherein the target values are received from a node of a telecommunications service provider, and wherein the telecommunications service provider manages the target values via Open Mobile Alliance (OMA) device management framework.

4. The at least one non-transitory computer-readable storage medium of claim 1, wherein the identified parameter is associated with two or more target values, wherein the user equipment receives a selection among the two or more target values of the identified parameters, and wherein the user equipment presents the alert based on the selected target value.

5. The at least one non-transitory computer-readable storage medium of claim 1, wherein the alert at the user equipment enables a user of the user equipment to maintain the current state of the service for a particular time period.

6. The at least one non-transitory computer-readable storage medium of claim 1, wherein the alert at the user equipment enables a user to maintain the current state of the service for a particular time period, and wherein the alert communicates to the user that the current state of the service will be changed to another state at an end of the particular time period.

7. The at least one non-transitory computer-readable storage medium of claim 1, wherein the another state is the previous state.

8. The at least one non-transitory computer-readable storage medium of claim 1, wherein the service associated with the user equipment is:
voice over 5G,
voice over WiFi,
using a 5G radio,
using Bluetooth,
using WiFi, or
using a roaming access domain.

9. The at least one non-transitory computer-readable storage medium of claim 1, wherein the system is further caused to:
store the received target values of the one or more parameters in a memory configurable connected to the user equipment.

10. The at least one non-transitory computer-readable storage medium of claim 1, wherein monitoring the current value of the identified parameter comprises changing the timer or counter value by a minimum value.

11. The at least one non-transitory computer-readable storage medium of claim 1, wherein the state of the service is: enabled or disabled.

12. The at least one non-transitory computer-readable storage medium of claim 1, wherein the change of state of the service is triggered when a user of the user equipment modifies the state of the service via a user interface.

13. The at least one non-transitory computer-readable storage medium of claim 1, wherein the system is further caused to:
transmit, at periodic intervals, a message comprising one or more of the following information about the user equipment: a current state of the service associated with the user equipment, the current value of the identified parameter, or the target value of the identified parameter.

14. A computer-implemented method for dynamically managing states of one or more services of features associated with a user equipment, the method comprising:
receiving target values of one or more parameters in a set of configurable parameters;
determining a change of state of a service associated with a user equipment from a previous state to a current state;
identifying, at the user equipment, a parameter, selected from the set of configurable parameters, associated with the service;
monitoring, at the user equipment, a current value of the identified parameter; and
when the current value of the identified parameter is within a threshold value of a target value of the identified parameter, presenting an alert at the user equipment indicating that the current state of the service associated with the user equipment will be changed to another state,
wherein the target value of the identified parameter is based on an identity of a network via which the user equipment is communicating.

15. The method of claim 14, wherein the alert at the user equipment enables a user to maintain the current state of the service for a particular time period, and wherein the alert communicates to the user that the current state of the service will be changed to another state at an end of the particular time period.

16. The method of claim 15, wherein the identity of the network is a home network or a roaming network.

17. The method of claim 15, wherein the service associated with the user equipment is:
voice over 5G,
voice over WiFi,
using a 5G radio,
using Bluetooth,
using WiFi, or
using a roaming access domain.

18. A method performed by a node of a telecommunications service provider, the method comprising:
receive, from a user equipment, configuration information associated with the user equipment,
wherein the configuration information comprises a current state of a service or feature associated with the user equipment;
responsive to a triggering event, determining updated target values of one or more parameters associated with the service or feature of the user equipment; and
transmit, to the user equipment, the determined updated target values of the one or more parameters,
wherein, based upon the current value of the one or more parameters being within a threshold value of the updated target value of the one or more parameters, the user equipment presents an alert when the current state of the service or feature will be changed to another state.

19. The method of claim 18, wherein the triggering event comprises:
receiving a request for the updated target values from the user equipment,
offering of a new service or feature to a user of the user equipment, or
receiving the configuration information associated with the user equipment.

20. The method of claim 18, wherein the wherein the telecommunications service provider manages transmitting the updated target values via Open Mobile Alliance (OMA) device management framework.

* * * * *